(12) United States Patent
Cohn et al.

(10) Patent No.: US 8,326,665 B2
(45) Date of Patent: Dec. 4, 2012

(54) SYSTEM AND METHOD FOR USING A COMPONENT BUSINESS MODEL TO ORGANIZE AN ENTERPRISE

(75) Inventors: David L. Cohn, Dobbs Ferry, NY (US); Robert D. Dill, Raleigh, NC (US); David Bernard Flaxer, Dobbs Ferry, NY (US); George M. Galambos, Montreal (CA); Robert H. Guttman, Stamford, CT (US); Raman Harishankar, Blacklick, OH (US); David Robert Kress, Carmel, IN (US); Christopher Murasso, Eastchester, NY (US); Jeffrey A. Neville, Chicago, IL (US); Clifford Alan Pickover, Yorktown Heights, NY (US); George Edmund Pohle, Morristown, NJ (US); Guy Jonathan James Rackham, New York, NY (US); Shanker Ramamurthy, New York, NY (US); John R. Smith, New York, NY (US); Stephen Michael Smith, Westlake Village, CA (US); Laurie A. Tropiano, Old Greenwich, CT (US); John George Vergo, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 550 days.

(21) Appl. No.: 11/182,062

(22) Filed: Jul. 15, 2005

(65) Prior Publication Data
US 2007/0027701 A1 Feb. 1, 2007

(51) Int. Cl.
G06Q 10/00 (2012.01)
G06Q 50/00 (2012.01)
(52) U.S. Cl. ............................. 705/7.12; 705/7.23

(58) Field of Classification Search .................. 707/102; 717/103; 705/7.12, 7.23
See application file for complete search history.

(56) References Cited

U.S. PATENT DOCUMENTS

| | | | |
|---|---|---|---|
| 6,011,559 A * | 1/2000 | Gangopadhyay et al. ..... 345/440 |
| 6,292,790 B1 * | 9/2001 | Krahn et al. .................. 705/50 |
| 6,601,233 B1 | 7/2003 | Underwood |
| 7,010,666 B1 * | 3/2006 | Barber et al. ................. 711/220 |
| 7,293,014 B2 * | 11/2007 | Subramaniam et al. .......... 707/3 |
| 7,308,414 B2 * | 12/2007 | Parker et al. ..................... 705/7 |
| 7,574,694 B2 * | 8/2009 | Mangan et al. ................ 717/123 |
| 2002/0026630 A1 * | 2/2002 | Schmidt et al. ............... 717/103 |
| 2002/0198751 A1 * | 12/2002 | Ernest et al. ..................... 705/7 |
| 2003/0033191 A1 * | 2/2003 | Davies et al. ................... 705/10 |
| 2003/0236691 A1 * | 12/2003 | Casatl et al. ..................... 705/8 |
| 2004/0143470 A1 * | 7/2004 | Myrick et al. ................... 705/7 |
| 2004/0243816 A1 * | 12/2004 | Hacigumus et al. .......... 713/193 |
| 2006/0161879 A1 * | 7/2006 | Lubrecht et al. ............. 717/101 |
| 2006/0178920 A1 * | 8/2006 | Muell .............................. 705/8 |

* cited by examiner

Primary Examiner — Truong Vo
Assistant Examiner — Sabana Rahman
(74) Attorney, Agent, or Firm — Whitham, Curtis, Christofferson & Cook, P.C.; Daniel P. Morris (57) ABSTRACT

A system and method is described for using a component business model to partition a business into non-overlapping components, and then allocating different components to appropriate organizing strategies, based on attribute values assigned to each component. In the best mode of implementation there are two attributes: whether or not the component differentiates the business within the market place; and whether the component is industry standard or is tailored by the organization. These attributes and their values map the components of the business to a matrix. Based on the combination of attribute values in each cell of the matrix, available organizing strategies are also mapped to the matrix, thereby identifying for each component an appropriate organizing strategy.

9 Claims, 5 Drawing Sheets

SYSTEM AND METHOD FOR USING A COMPONENT BUSINESS MODEL TO ORGANIZE AN ENTERPRISE

This invention is related to commonly owned patent application Ser. No. 11/176,371 for "SYSTEM AND METHOD FOR ALIGNMENT OF AN ENTERPRISE TO A COMPONENT BUSINESS MODEL" which is incorporated by reference herein.

BACKGROUND OF THE INVENTION

1. Field of the Invention

The present invention generally relates to component based business models and, more particularly, to using a component business model as a basis for organizing the business.

2. Background Description

The problem solved by the invention is: "how do I decide what the correct operational strategy is for my business components". In traditional organization analysis, companies have generally focused on efficiency or effectiveness, and have almost always favored efficiency across all the processes in an organization. There is no ability to map out different strategies for different parts of the organization, stressing efficiency considerations where that is appropriate and stressing effectiveness considerations where that is appropriate (e.g., one part of the organization focused on aspects of the business that differentiated the company from its competitors and where effectiveness was primary, another part of the organization to focus on services shared throughout the company, another part to make outsourcing decisions, etc.).

SUMMARY OF THE INVENTION

It is therefore an object of the invention to provide a framework for organizing a business that distinguishes between efficiency and effectiveness considerations and applies those considerations appropriately to different parts of the business.

A further object of the invention is to identify the various options for organizing those parts of a business needing improvement and sensibly apportion those parts to the appropriate options.

The invention uses a component business model (CBM) as defined in co-pending and commonly owned application Ser. No. 11/176,371 for "SYSTEM AND METHOD FOR ALIGNMENT OF AN ENTERPRISE TO A COMPONENT BUSINESS MODEL" (hereinafter termed "the above referenced foundation patent application"), and more particularly the invention uses a component map generated as described therein for a business. The invention's best mode of implementation uses a heat map of components that the business has decided to focus on for the purpose of improving the organization of the enterprise.

CBM provides a logical and comprehensive view of the enterprise, in terms that cut across commercial enterprises in general and industries in particular. The component business model as described in the above referenced foundation patent application is based upon a logical partitioning of business activities into non-overlapping managing concepts, each managing concept being active at the three levels of management accountability: providing direction to the business, controlling how the business operates, and executing the operations of the business. The term "managing concept" is specially defined as described in the above referenced foundation patent application, and is not literally a "managing concept" as that phrase would be understood in the art. For the purpose of the present invention, as for the related invention, "managing concept" is the term associated with the following aspects of the partitioning methodology. First, the methodology is a partitioning methodology. The idea is to begin with a whole and partition the whole into necessarily non-overlapping parts. Second, experience has shown that the partitioning process works best when addressed to an asset of the business. The asset can be further described by attributes. Third, the managing concept must include mechanisms for doing something commercially useful with the asset. For a sensibly defined managing concept these mechanisms must cover the full range of management accountability levels (i.e. direct, control and execute). Managing concepts are further partitioned into components, which are cohesive groups of activities. The boundaries of a component usually fall within a single management accountability level. It is important to emphasize that the boundaries between managing concepts (and between components within managing concepts) are logical rather than physical.

The method of the invention creates a component map of the business, the components being non-overlapping, and then identifies two or more attributes applicable to the components, each attribute having two or more distinct values. The method then associates each of a plurality of organizing strategies with a different combination of values of the attributes, and maps the components to the organizing strategies by evaluating each component by each attribute.

In the method of the invention, a small number of attributes are evaluated for each component, and the strategies for organizing the business in light of these attributes are associated with different combinations of the values of these attributes. There are a limited number of these organizing strategies, and the strategy most appropriate for particular components can be mapped to the components of the business based on values of these attributes. In the best mode of implementation of the invention two attributes each having two values are used. First, a determination is made whether or not the component differentiates the business from its competitors in the market place. Second, it is determined whether the component performs in an industry standard manner or is tailored to the business. The two values in each of these two categories can be represented as a 2×2 matrix, with each of the four combinations of the two attributes being associated with one of four options for organizing a component.

One option, applicable to components that differentiate the business and are tailored to the business, is to focus on achieving superiority in the component. A second option, applicable to components that differentiate the business but perform in a manner that is standard throughout the industry, is to partner with a specialist company who will achieve superior performance for each of these components. A third option, applicable to components that do not differentiate the business and perform in a manner that is standard throughout the industry, is to outsource the work to a company that will perform the component at low cost. If such a company does not exist, this option may be pursued by creating a new entity to perform the component or partnering with an existing outsource provider to create such an entity. Finally, for those components that do not differentiate the business but are tailored to the business rather than being standardized across the industry, there is the option of seeking maximum efficiency by consolidating these components across the business.

Using a component business model (CBM) for an industry and a simple 2×2 framework that shows how to divide and measure the components, the best mode of implementing the invention identifies an appropriate operational strategy for each component in a business. This approach describes how considerations of efficiency and effectiveness drive application of different options for organizing the components of the business: which components they should invest in to create differentiation, which components of the business they should consolidate into shared services, which components they should strongly consider assigning to outside specialists, and which components they should outsource to a third party provider.

This invention allows an organization to develop appropriate strategies for every part of the business. If strategic resources are limited, the invention may be applied to the most critical components, such as those identified in a heat map, or components otherwise identified as having priority.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
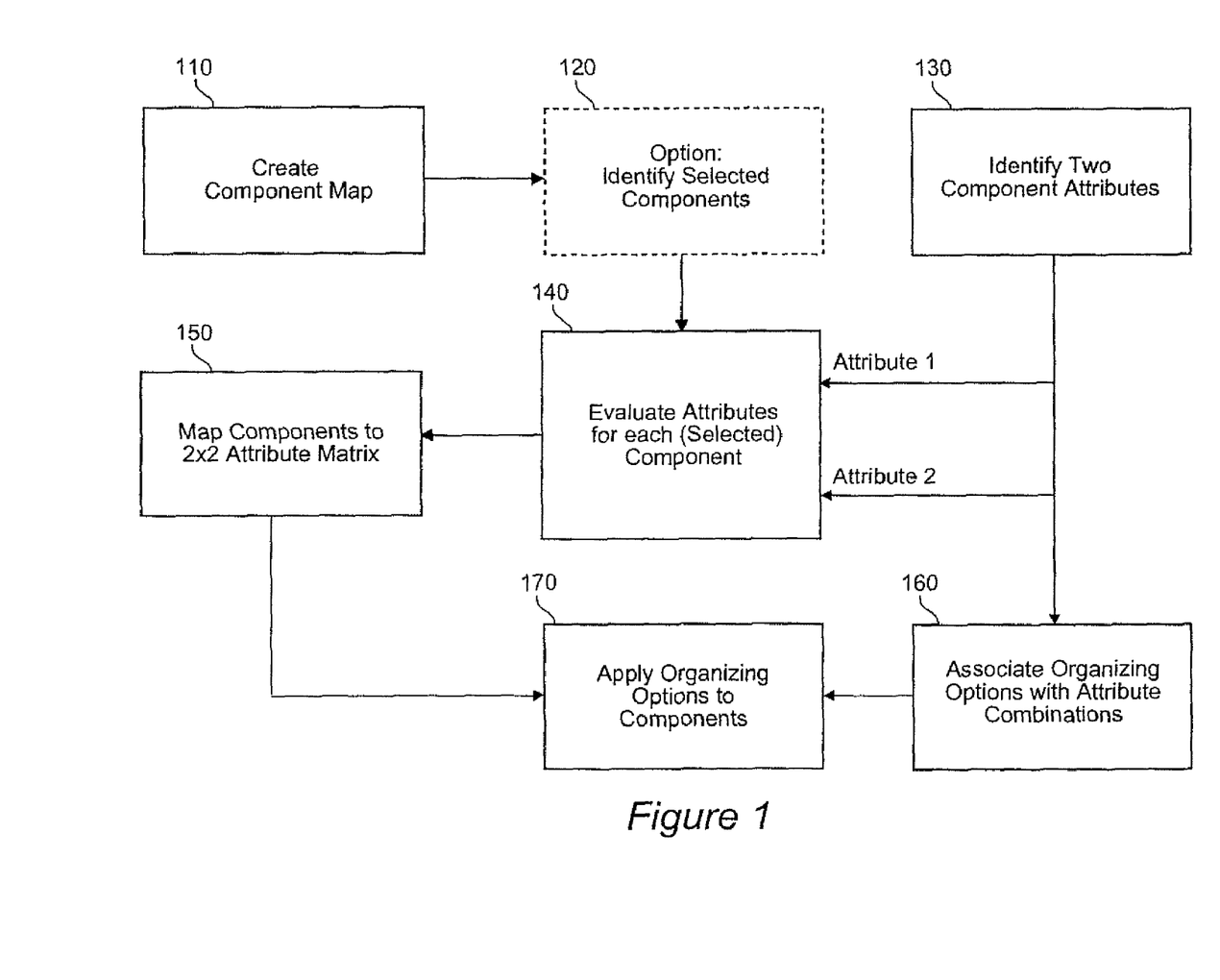
FIG. 1 is a flow chart showing the method of the invention.

The process works as will now be described with reference to FIG. 1. Once a component business model (CBM) 110 has been created for an organization (which starts with an industry standard map and then goes through a customization process to tailor the map to that specific company), component attributes and values for these attributes are identified 130, such that the attribute values, in combination, provide a mapping to options for organizing a component. In the best mode of implementing the invention two component attributes are identified, and each of these attributes has two values: whether or not the component differentiates the business in the marketplace; and whether the component is operated in a manner that is standard across the industry within which the business competes or whether the component is tailored to the particulars of the business. Each component is evaluated 140 and assigned a value for each of the identified attributes. Optionally, the evaluation and assignment of values may be limited to selected components 120. For example, the managers of the business may choose to focus the organizing effort on certain aspects of the business or exclude other aspects of the business.

In the best mode of implementing the invention, the evaluation 140 of the first attribute determines which components are truly differentiating to the business and drive shareholder value. This is done through a series of questions and interviews with the senior management of a firm and typically requires 1-2 mini-workshops over the course of a week to tailor the questions to their industry and gain agreement on which components are differentiating. Since the purpose of this evaluation is to determine an appropriate organizing strategy for each component, rather than identify components for alignment to a component business model, the threshold for determining that a component is differentiating may not necessarily be the same as for the base-competitive-differentiating classification used in the above referenced foundation patent application.

Evaluation of the second attribute determines which components are operated in an 'industry standard' manner (e.g. accounting, human resources, procurement, credit checking, etc)—that is, everyone in the industry performs the activities within the business components identically (or nearly identically), as compared to the other components which each company in the industry generally tailors to the particulars of the business. This determination is also driven by insights from the above described interviews with senior management.

After the evaluation 140, each component is then mapped 150 to a matrix defined by the various possible combinations of values of the identified attributes values. In the best mode of implementing the invention, each evaluated component is placed in one of the cells of the 2×2 framework shown in FIG. 3, where the vertical axis is tagged as "organization specific" 310 and "industry generic" 320, and the horizontal axis is tagged "non-differentiating" 330 and "differentiating" 340. In turn, returning to FIG. 1, the various organizing options are associated 160 with appropriate attribute value combinations. Consequently, placing the components in the matrix 300 based on how they are classified on the identified attributes (e.g. the two best mode attributes shown in FIG. 3) creates a unique, operating strategy for applying different organizing options to different components, an operating strategy that reflects the insights obtained in evaluating the components against the identified attributes.

Returning to FIG. 3, the business components that are in the upper right hand quadrant 360 (so they are organization specific 310 and differentiating 340) are the components that the company wants to "achieve superiority" in, i.e., those are the components which create the highest levels of value in the organization and the company wants to focus on making the performance of these components "best in class." Also, it is in these portions of the organization that the company is concerned with achieving effectiveness (versus efficiency).

Figure 3:
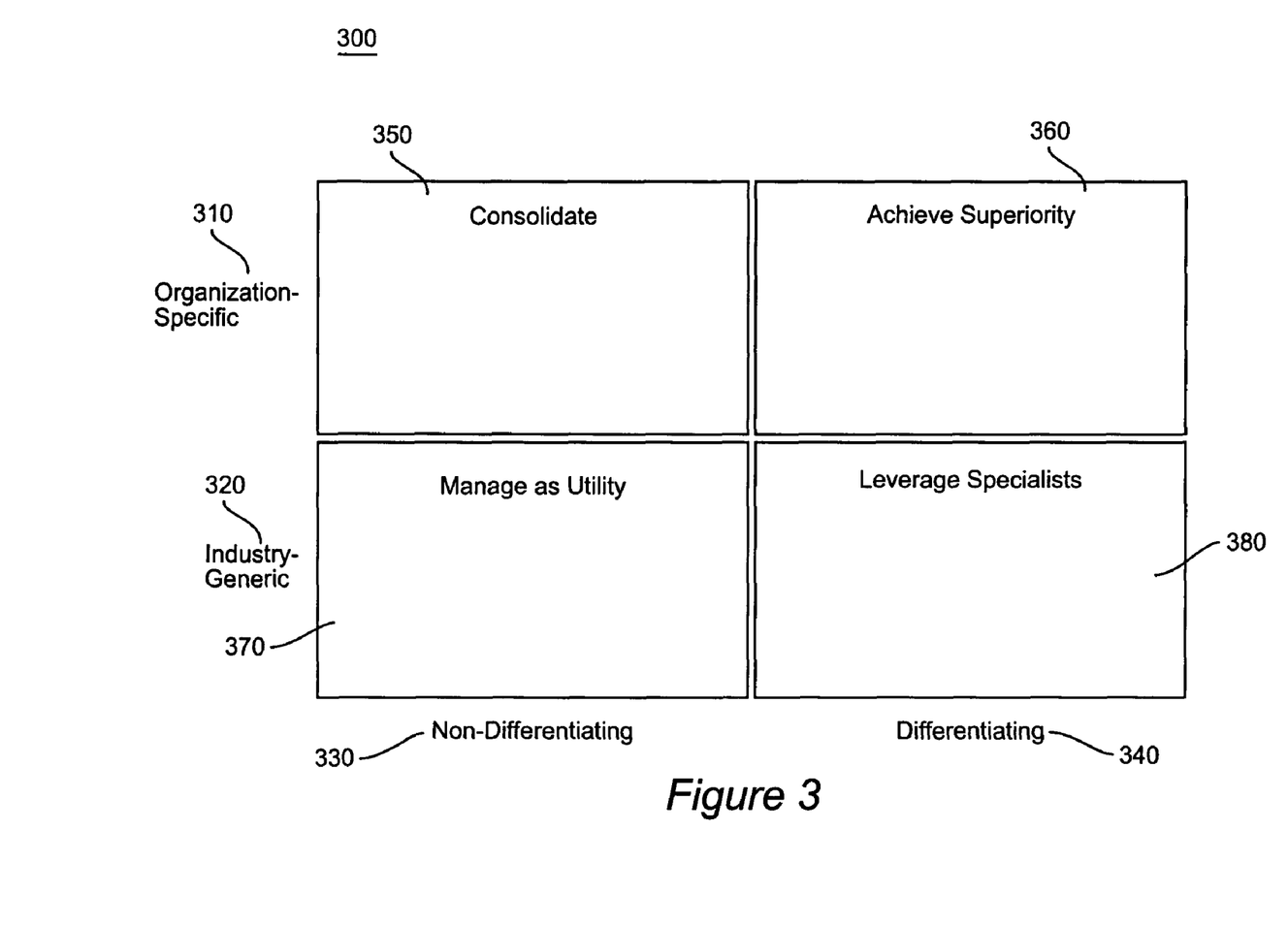
FIG. 3 is 2×2 matrix showing business strategy arrayed by component attributes.

The business components in the bottom right hand quadrant 380 (so they are industry generic 320 but differentiating 340) are the types of components that an organization should consider using "leveraging specialists" to operate. The internal capability is not unique, and "best-in-class" partners exist in the marketplace. The object of is to seek tightly integrated relationships with superior performers to operate these components. Examples include components like advertising and branding, activities for the organization that can help achieve significant value yet are better done by outside specialists. Companies generally rely on the expertise of others for components in this quadrant 380, and these components are also important in driving effectiveness of the business strategy.

The components that are placed on the bottom left hand quadrant 370 are standard in the industry 370 and are non-differentiating 330 (e.g. human resource components, finance and accounting components). These are the components in which a company needs to create the highest overall levels of efficiency by managing as a utility, and therefore should look to external providers that have the scale to provide the lowest costs. The object for these components is to operate on specific service-level agreements with variable pricing, and use partners with low cost of entry and high reliability. The components that fall within this quadrant 370 are those that should be outsourced if the company is not able to create a high degree of cost efficiency internally.

The components in the upper left hand quadrant 350 are not differentiating 330 to the business (which really means that no matter how good they operate those components—like accounting in a steel manufacturing business—it won't differentiate the business to the end customer or create additional shareholder value). The company must do the component well, but there's no advantage in doing it better than the competition. These components are tailored to the organization 310 and are the kinds of components that should be considered for consolidation 350 across the company in order to maximize efficiency and consistency. Customization and integration with other business activities limits outsourcing opportunities. Examples are components like treasury, risk management, etc. Components in this quadrant 350 are good candidates for shared services, as many companies duplicate these activities unnecessarily across the organization.

Once these steps have been completed the company has a complete operational blueprint for the components in the organization (a "to-be" operating model) and then specific strategies are put in place to get the organization from the current state ("as-is") to the "to-be" state (by directing investments, making outsourcing decisions, consolidating activities, reallocating resources, and the like). If strategic resources are limited, the invention may be applied to the most critical components, such as those identified in a heat map, or components otherwise identified as having priority.

Figure 2:
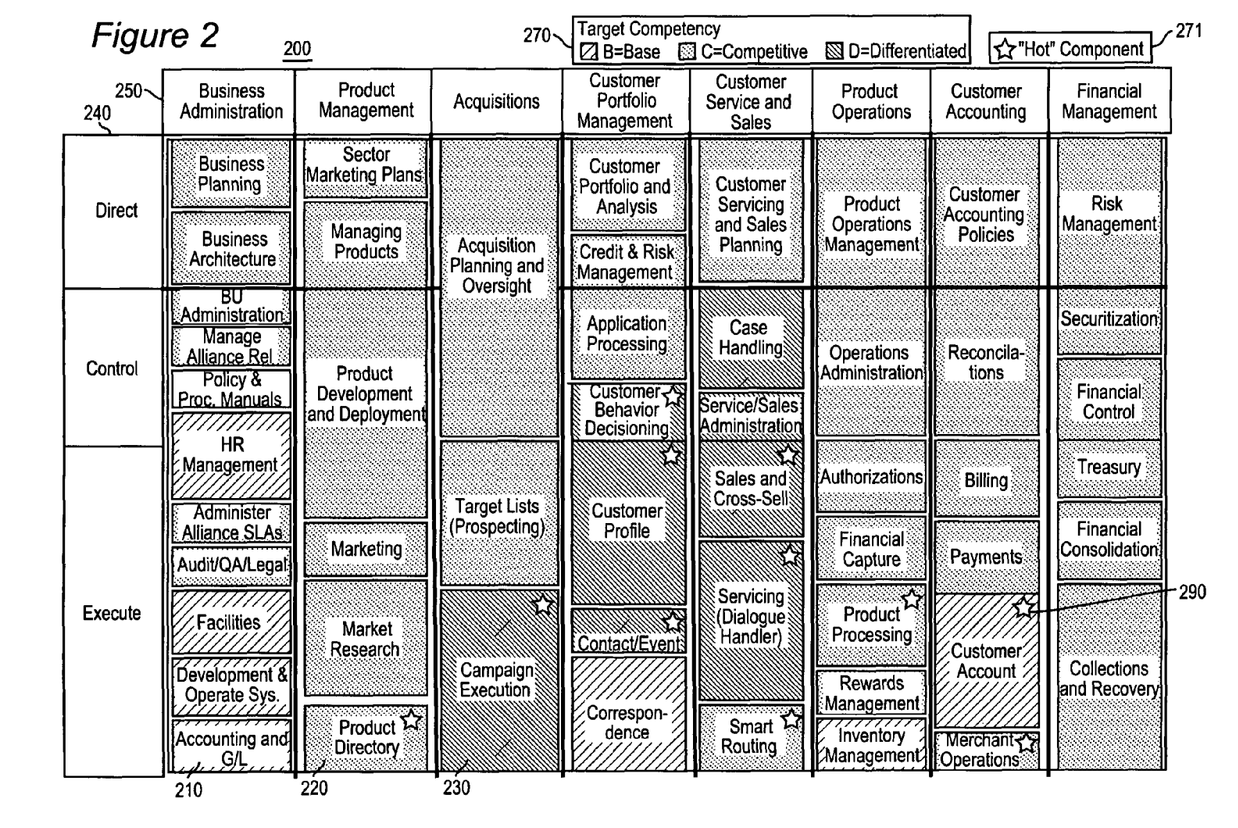
FIG. 2 is an exemplar component map showing "hot" components.

For example, consider the heat map shown in FIG. 2. Component map 200 arrays components by competency 250 and management level 240. As shown in legend 270, the components have been classified into three categories, according to whether it is sufficient to operate the component at a base level (e.g. 210), or whether it is necessary that the component operate to a standard set by the competition (e.g. 220), or whether the component is one which can be used to differentiate the business from the competition and create added shareholder value (e.g. 230). After combining the factor shown in legend 270 with other factors, a number of components are identified according to legend 271 as being "hot" (e.g. 290), that is, components whose alignment with the component business model would be most likely to improve the business, given a particular limitation on the time and resources available for the alignment (as further described in the above referenced foundation patent application). Although not the only methodology for prioritizing the implementation of organizing options in accordance with the present invention, focusing on "hot" components (e.g. 290) in a heat map is a methodology consistent with the invention.

Figure 4:
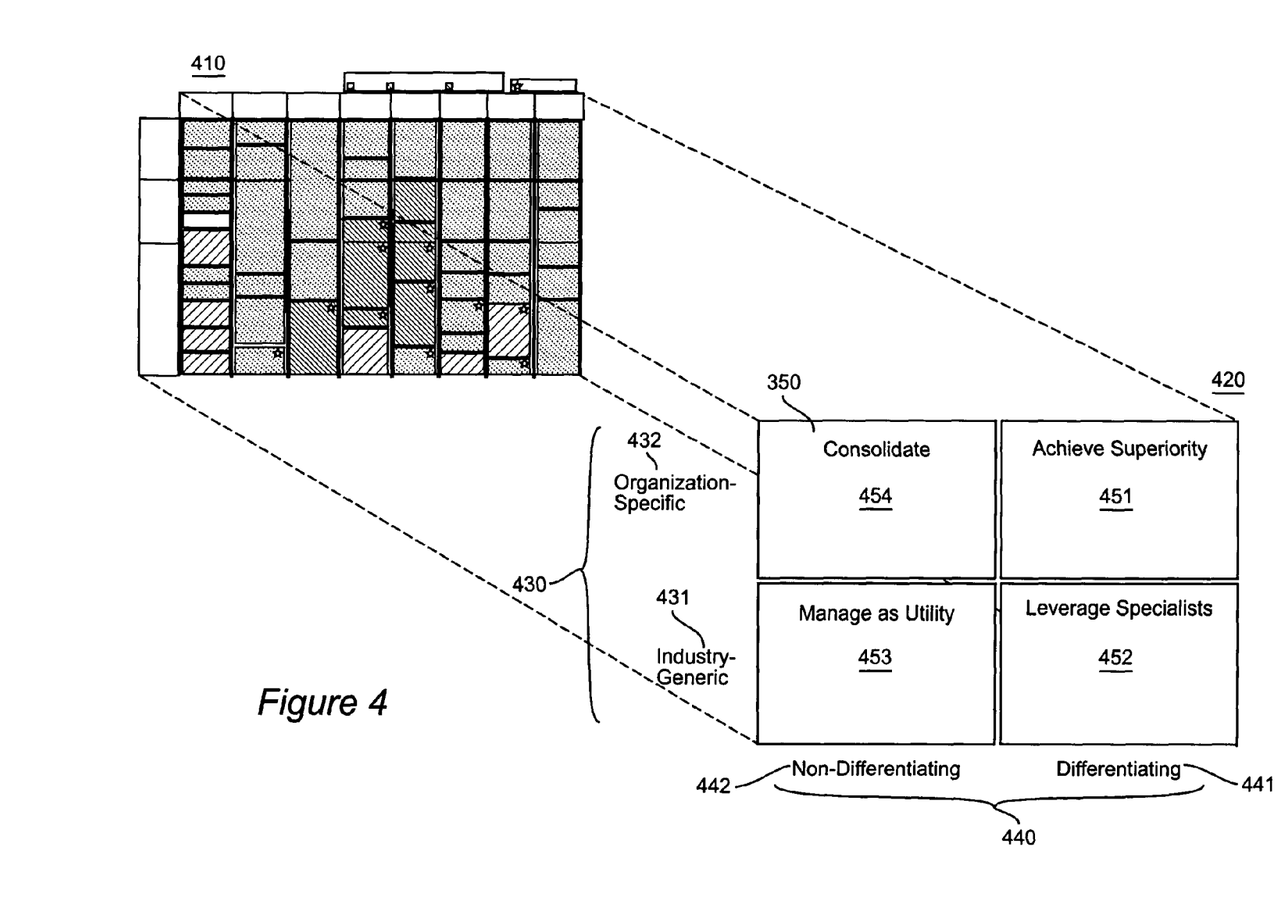
FIG. 4 is a drawing figure showing a mapping of components from FIG. 2 into the business strategy matrix of FIG. 3.

The invention may be summarized with reference to FIG. 4, which shows how the invention relies upon a component map 410. By evaluating each component in the component map 410 according to selected criteria (430, 440), the values of the selected criteria (431 and 432; 441 and 442) provide a mapping of the components to a matrix 420. Further, the various combinations of these values can be associated with the various options for organizing a component, so that these organizing options (451, 452, 453 and 454) can also be mapped to the same matrix 420. Thus the dual mapping to a common matrix 420 results in an association of components with organizing strategies appropriate for the business in view of the selected criteria.

The foregoing discussion pertains to the best mode of implementing the invention. The scope of the invention may be understood by considering alternative implementations. For example, each component may be evaluated along a service maturity parameter having the following five levels, each level serving as a value: initial (most services are ad hoc); managed (most services are identified); defined (services are well defined); predictable (services are measured); and optimizing (measurements are used for continual improvement of business services). Each component is given one of these five levels as a capability maturity target, and is then rated as to the "current state" of its capability maturity. The gap between the target and actual maturity will then be a number of levels (0, 1, 2, 3 or 4). In this implementation of the invention, instead of using two values distinguishing between whether a component is operated in an industry standard manner or in a manner tailored to the business, the values along this axis show a measure of a maturity gap for each component.

In this implementation the second axis could remain the same as in the preferred embodiment, namely, using two values distinguishing between components which differentiate the business and components that do not differentiate the business. Alternatively, a further implementation of the invention could replace this heat map related measure with another measure. For example, each component could be evaluated on its criticality for achieving the strategic objectives of the business in terms of a service maturity model (SMM) having the following five levels of maturity: initial (most services are ad hoc); managed (most services are identified); defined (most services are well defined); predictable (services are measured); and optimizing (measurements are used for continual improvement of business services). In this implementation each component is given a capability maturity target, and then is rated according to its "current state" capability maturity. The difference between the target and the actual maturity level (e.g. a "0" value if the component is on target, a "1" value if the actual capability of the component is short by one level, etc.) is a measure of the gap between the target maturity level of the component and the actual maturity level of the component.

The service maturity level gap can then be used as an attribute in place of the above described attribute that distinguished between components that are operated at an industry standard and components that are specific to the business. In this implementation of the invention the other attribute used for the mapping to the various organizing options is the same attribute used in the preferred embodiment, namely, the attribute that distinguished between components that differentiated the business and components that did not differentiate the business.

Another implementation would replace the latter attribute with an attribute that categorizes components by criticality for achieving the strategic objectives of the business: a value of "low" or "1" where the execution of the component is relatively unrelated to the strategic objectives of the business; and a value of "high" or "2" where the component is central to the ability of the business to achieve its strategic objectives.

In either of these last two implementations, the analysis provided by the invention helps identify "low hanging fruit", i.e. components that are relatively close to their target (i.e. components that have a narrow service maturity gap) and are very important to the business. Such components are appropriate candidates for priority attention to improve their service maturity level within the business. This organizing option is analogous to the above described organizing option of achieving superiority for the component. Components that are strategically important but have a wide service maturity gap may indicate that the business is not well suited to provide the desired service maturity and therefore outsourcing to specialists may be the preferred organizing strategy. Note that this organizing option may not involve leveraging industry specialists, as described above, but rather incubating a specialist organization with close ties to the business. For components that are not strategically important the appropriate organizing option may be to consolidate or manage as a utility with respect to service maturity level, depending upon whether the component is organization specific or industry generic.

Note that this implementation of the invention provides a three attribute basis for determining organizing options and allocating components to those options, and demonstrates that the organizing options may vary with the particular attributes being evaluated and the objectives being served by these evaluations. The value of using the CBM model is that it provides a fairly coarse grained partitioning of the enterprise, providing a systematic methodology for analysis of the organizing options for the enterprise using a manageable number of components. This provides the flexibility necessary for responsiveness to changing business conditions. For example, it should be noted that organizing options can be viewed in reverse. While the CBM structure is reasonably constant, attributes and evaluations may change with the marketplace over time. A component that was appropriately classified for internal consolidation (350, in FIG. 3) at one time may at a later point in time be classified in another organizing category. For example, the industry may have evolved so that the component is an industry standard and can be managed as a utility (370, in FIG. 3). Or perhaps the component has become a differentiator in the marketplace, with partners being available who can best leverage specialist skills (380, in FIG. 3). In either situation, it will be appropriate to reverse the consolidation executed under a prior organizing strategy, thus generating a "deconsolidation" strategy.

Figure 5:
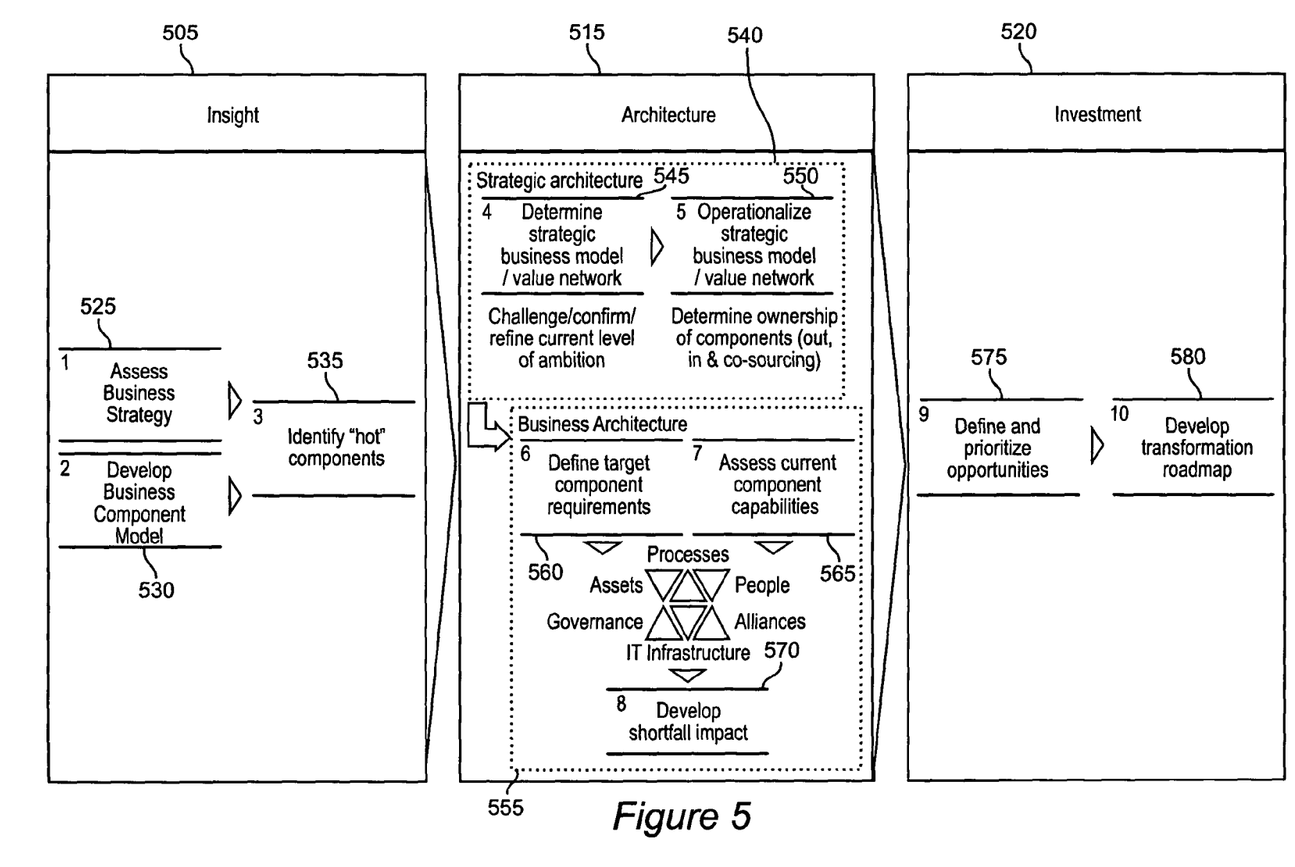
FIG. 5 is a schematic showing a phased sequence of steps for organizing a business using a component business model.

Turning now to FIG. 5, there is shown a schematic diagram of a phased sequence of steps for organizing a business using a component business model. In the first phase 505 insight is obtained into the business. An assessment is made of business strategy 525 and a component business model of the business is developed 530. Those components having priority for the business—"hot" components—are identified 535.

A second phase 515 addresses the architectural needs of the business. A strategic architecture 540 evaluates the impact of shortfalls between current and required capabilities, to support the business strategy and corresponding business operating model in terms of: processes, IT infrastructure, people, assets, governance, and alliances. This includes determination 545 of a strategic business model and value network reflecting current ambitions for the enterprise. A background assessment is required to determine feasibility and readiness within the organizational culture. In addition, firms must identify their strategic ambition and should identify differentiating competencies (where most value can be added) and define what role the company is to play in one or more value networks in the business ecosystem.

Then the strategic business model is operationalized 550 by determining ownership of the business components. The CBM heat map is used for determining a company wide roadmap based on the strategic assessment of the appropriate organizing options (e.g., centralize, professionalize, off shore, co-source, out source, in source) for each component. The operationalization of the strategic architecture 540 into business architecture 555 is focused on "hot" components. Target component requirements are defined 560. This step uses several sources of technical and sector knowledge and experience, including those from within the business organization and from external subject matter experts in order to define the prevailing technical practices for each business component. The result is an overview of prevailing component best practices. The step also develops an overview of the required collaboration between components plus the capabilities required.

Current component capabilities are then assessed 565 based on the target component requirements. In this step, status quo opportunities are considered to align with future efforts. Lastly, an analysis across the component map is made of any gaps, over-extensions and duplications in the current systems, as further described in the above referenced foundation patent application. A shortfall impact is then developed 570. To determine the component and capability gaps between the current situation and the target situation, a shortfall analysis is conducted to determine the impact. Next, opportunities for improvement are identified. These serve as an input for locating investment opportunities In the final investment phase 520, a transformation roadmap is developed, in order to coordinate the incremental realization of benefits. Steps in this phase can be performed with some overlap and iteration as the roadmap evolves and subsequently as business priorities change over time. After the architecture phase 515, a defined list of opportunities 575 needs to be created. From that list, a structured process of screening different kinds of opportunities is required in order to prioritize the list. The end result is a set of detailed investment opportunities that can be developed into a project plan. The transformation roadmap 580 involves development of formal business cases, with an agreed overview of quantified benefits and costs that is validated with and signed by relevant stakeholders. Risk needs to be mitigated through an assessment that highlights key concerns. Lastly, a transformation roadmap 580 is developed that combines all sub-tasks of selected projects into a single plan.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of organizing a business or organization to maximize or take into account both effectiveness and efficiency for non-overlapping components of the business or organization, comprising the steps of partitioning the business or organization into non-overlapping components in a component map using said computer; said partitioning taking assets of the business and producing partitions (components) that are mutually exclusive and collectively complete, each said respective component including respective mechanisms for doing something commercially useful with said respective assets;

evaluating, using said computer, at least one of said non-overlapping components with respect to at least two attributes of said respective assets wherein each of said at least two attributes has at least two attribute values;

forming, using said computer, a matrix of cells by crossing said attributes, each cell having no more than one value of any attribute and each cell having a different combination of values of said attributes;

performing a first mapping onto said matrix by associating each cell in the matrix with one of a plurality of organizing strategies, each associated organizing strategy being determined by the combination of attribute values in the cell;

performing a second mapping onto said matrix by associating each of said non-overlapping components with a cell in said matrix corresponding to the attribute values determined in said evaluating step; and applying for at least one cell in the matrix the organizing strategy from the first mapping to said non-overlapping components from the second mapping, wherein said organizing strategies differentiate from one another, and wherein said differentiation includes stressing efficiency where that is appropriate in view of said corresponding combination of attribute values and stressing effectiveness where that is appropriate in view of said corresponding combination of attribute values.

2. The method of claim 1, wherein said at least two attribute values are selected from i) whether or not the components differentiates the business in the market place and ii) whether or not the component is industry standard or is tailored by the business/organization.

3. The method of claim 2, wherein the component that is industry standard is selected from the group consisting of accounting, human resources, procurement, and credit checking.

4. The method of claim 1, wherein said at least two attribute values are selected from i) whether or not the components differentiates the business in the market place and ii) a service maturity level gap attribute.

5. The method of claim 1, wherein said at least two attribute values are selected from i) whether or not the components differentiates the business in the market place and ii) criticality for achieving strategic objectives of the business or organization.

6. The method of claim 1, wherein said at least two attribute values are selected from i) a service maturity level gap attribute; and ii) criticality for achieving strategic objectives of the business or organization.

7. The method of claim 1 wherein said evaluating step and said second mapping step are performed on a plurality of said non-overlapping components, and further comprising identifying only selected components within said non-overlapping components on which to perform said evaluating step and said second mapping step.

8. The method of claim 7, wherein said selected components are "hot" components determined by constructing a "heat map" overlay upon the component map.

9. The method of claim 1, further comprising prioritizing by component implementation of mapped organizing strategies.

\* \* \* \* \*